United States Patent [19]

Jönsås

[11] Patent Number: 4,600,234
[45] Date of Patent: Jul. 15, 1986

[54] SUN VISOR FOR MOTOR VEHICLES AND BEARING MEANS THEREFORE

[75] Inventor: Mats Jönsås, Ljusne, Sweden

[73] Assignee: Autopart Sweden Ab, Malung, Sweden

[21] Appl. No.: 668,985

[22] Filed: Nov. 6, 1984

[30] Foreign Application Priority Data

Nov. 11, 1983 [SE] Sweden .................................. 8306222

[51] Int. Cl.⁴ ................................................ B60J 3/02
[52] U.S. Cl. .................................................. 296/97 K
[58] Field of Search ................. 296/97 K, 97 H, 97 R; 248/291; 403/329, 155, 397

[56] References Cited

U.S. PATENT DOCUMENTS 4,469,367 9/1984 Kuttler et al. ..................... 296/97 K

FOREIGN PATENT DOCUMENTS 2201250 7/1973 Fed. Rep. of Germany .
85469 7/1965 France .
1093092 11/1967 United Kingdom ............. 296/97 K Primary Examiner—Robert R. Song
Attorney, Agent, or Firm—Young & Thompson

[57] ABSTRACT

The invention relates to a sun visor for motor vehicles and to bearing structure therefor. The sun visor comprises an elongated body of foamed plastics material, in which there is embedded a main bearing, a shaft holder for a second bearing and a stiffening metal-wire frame. The main bearing and the shaft holder are connected together by a spacer shaft and the wire frame. Prior to embedding the components in the foamed plastics material, the main bearing, the shaft holder, the spacer shaft and the wire frame are all assembled to form an integral unit.

7 Claims, 6 Drawing Figures

SUN VISOR FOR MOTOR VEHICLES AND BEARING MEANS THEREFORE

The present invention relates to a sun visor, or anti-glare shield, for motor vehicles comprising an elongated body of moulded compressible material, preferably foamed plastic; a main bearing for rotatably journalling a main shaft; and a shaft holder for a further bearing, wherein the main bearing and the holder are embedded in spaced apart relationship in the body materail in the vicinity of one long side of the body. The invention also relates to a method for manufacturing such a sun visor.

A sun visor, anti-glare shield, for motor vehicles is a product is which is manufactued in very large quantilies, and consequently it is important, as with all mass-produced articles, that the sun-visor components are not only designed so that they themseleves can be produced rationally, at the lowest possible cost, but also that their design enables all the production stages, up to the final product, to be carried out as rationally a possible. When concerning a product such as a sun visor, which is produced in various designs to suit different models of vehicles, its is also important that as many of the individual component as possible can be used as standard in several different variations.

Hitherto, sun visor of the aforesaid kind have been designed in a manner which requires those components which are to be embedded in the foam plastics, i.e. such components as the main bearing, the shaft holder for the second bearing and, in certain cases, a spring clamp for the main shaft and/or a reinforcing metal wire frame, to be placed and positioned in the moulding tool manually.

The object of the present invention is to provide a sun visor of the aforementioned kind which is so constructed that ingoing conponents, such as primarily the main bearing and the shaft holder, can be placed in the moulding tool with the aid, for example, or a robot, so that manufacture of such sun visors can be automated to a great extent.

In accordance with the invention this is achieved by fixing the relaive positions of the main bearing and the shaft holder by means of a separate spacer element made of a rigid material and arranged between the main bearing and the shaft holder.

Such a design enables the main bearing and the shaft holder to be joined together with the aid of the spacer to form an assembly, which can then be placed in the mould tool with the aid of a robot. Preferably, the spacer has the form of a plastics shaft. The design enables the use of standardised sun-visor main bearings and shaft holders with varying distances between the main bearing and shaft holder, solely by varying the length of the spacer shafts. Purely from a functional aspect there is also afforded the advantage that an extremely soft sun visor can be gripped at its lower end and pulled down, without becoming twisted and distorted, since the spacer shaft is preferably non-rotatably connected to the bearing and the holder and is thus able to transfer between the bearings, so as to relieve the soft visor body of any load.

In a preferred embodiment of a sun visor according to the invention, which also includes a spring device which engages over the main bearing and with mutually opposing and laterally displaced spring legs presses against the main shaft through an opening in the main bearing, the spring legs are provided with end portions which are alternately bent in different directions and which engage one end of a stiffening metal-wire frame, the spring legs being so positioned that the wire frame counteracts the forces urging the spring legs apart on opposite of the shaft. In this case, the other end of the wire frame is joined with the shaft holder.

In a method for manufacturing the sun visor, the main bearing and the shaft holder, prior to being embedded in the mould, are joined together by means of the spacer shaft and connected to the wire frame with the aid of the spring to fix the wire frame at the main bearing, so as to form an intergal unit in the form of a closed frame.

In this way all component which are to be embedded in the elongated body form a unit which can be placed by a robot in the moulding tool. Since the main bearing and the shaft holder are fixed in their relative positions by the spacer shaft, the metal-wire frame can be produced with wide tolerances, and a given amount of deformation, which be difficult to avoid when handling and assembling, can also be permitted, particularly when the wire frame is connected to the shaft holder so as to be axially displacable.

The invention will now be described in detail with reference to an embodiment thereof illustrated in the accompanying drawing, in which FIG. 1 is a partially cut-away plan view of a sun visor according to the invention;

Figure 1:
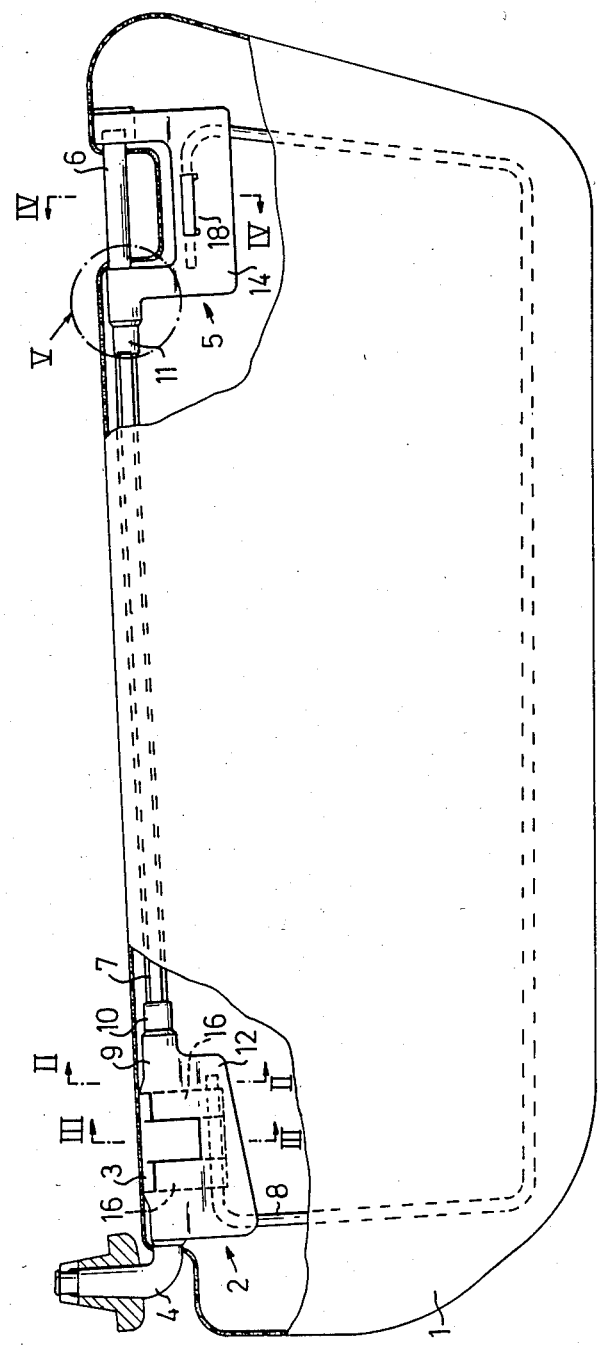

The sun visor illustrated in FIG. 1 comprises an enlongated body 1 of moulded foamed plastic. Embodied in the plastics material at one end of one long side of the body 1 is a main bearing 2 with clamp spring 3 for a main shaft 4. A U-shaped holder 5 for a pivot shaft 6 is embedded in the plastics material at the other end of the elongated body. Also embedded in the body 1 is a spacer shaft 7 and a stiffening metal-wire frame 8, both of which connect the bearing 2 and the holder 5 together.

The man bearing 2 has a tubular bearing part 9 in which the shaft 4 is mounted for rotation and which terminates in a bush 10 of square internal cross-section, into which one end of the spacer shaft having a corresponding square cross-sectional shape in inserted. The shaft holder 5 is provided with a corresponding bush 11 of square interanl cross-section, into which the other end of the spacer shaft extends, so that said spacer shaft holds the bearing 2 and the holder 5 in their relative positions and prevents rotary and axial movement thereof.

Extending downwardly from the tubular part 9 of the bearing 2 is a pair of parallel flanges 12 which define therebetween a gap 13, which accommodates one end of the wire frame 8. In a corresponding manner, the U-shaped holder 5 has extending downwardly therefrom two flanges 14, which define therebetween a gap 15 which accommodates the opposite end of the wire-frame 8. In this way the wire frame together with the spacer shaft contributes in transferring torque between the bearings of the sun visor as it is moved up and down.

Figure 3:
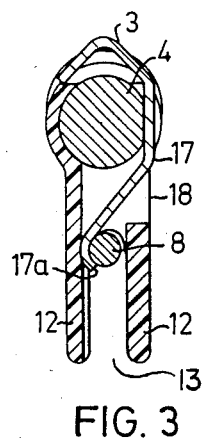
FIG. 3 is a sectional view in larger scale taken on the line III—III.
Figure 4:
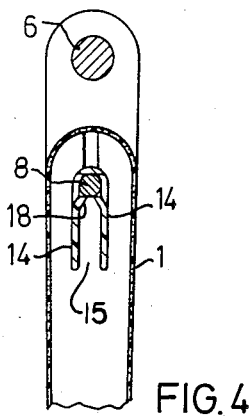
FIG. 4 is a sectional view taken on the line IV—IV in FIG. 1.
Figure 2:
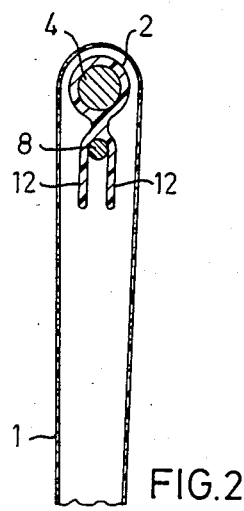
FIG. 2 is a sectional view taken on the line II—II in FIG. 1.

The wire frame 8 is held to the main bearing 2 with the aid of a spring clamp 3 which comprises a spring plate which has been bent into a U-shape and slit in a manner to form three spring legs 16, 17, of which the two outer legs 16 lie on one side of the shaft 4 and the centre leg 17 lies on the opposite side of said shaft. As shown in FIG. 3, the bearing 2 is provided with openig 18 oposite the spring legs, so that they can lie against the shaft 4 and so that the legs can project into the gap 13, the shaft being provided in the region thereof opposite the leg 17 with a planar surface, not shown, while in the region of the legs 16 the shaft is circular, whereby one 'snap position' for each revolution is obtained by pressue of the legs 17 against the shaft. For the purpose of firmly holding the wire frame 8, the spring legs are provided with circular arcuate, outwardly bent end portions 16a, 17a, of which the end portions 16a engage around the wire frame from one side thereof, while the end portion 17a engages said frame from the opposite side. Due to the shape of the end portions, the wire frame is preventd from being moved downwards in the gap 13 between the flanges 12, at the same time as the friction restricts the ability of the wire frame to move axially. One particular advantage afforded by the described arrangement is that the wire frame also prevents the spring legs from being pressed radially apart, and thus ensures that the spring legs will be held pressed against the shaft 4.

Downward movement of the wire frame in the gap 15 defined between the flanges 14 of the holder is prevented by two mutually opposed hooks 18 arranged on the inner surfaces of the flanges 14. On the other hand, there is nothing to prevent relative movement between the holder and the wire in the shaft direction. This is to permit limited variations in the distance between the main bearing 2 and the shaft holder 5, without needing to modify the wire frame, thereby enabling one and the same wire frame to be used in sun visor whose sizes vary within wide limits.

In the aforedescribed embodiment, the trunnion or shaft pivot 6 is fixed against rotational and axial movement relative to the holder 5 in a known manner, by means of co-acting shaped portions on the pivot shaft and holder.

Figure 6:
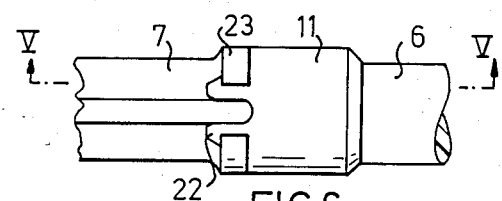
FIG. 6 is a sectional view of the ringed part V in FIG. 1 in a modified embodiment.
Figure 5:
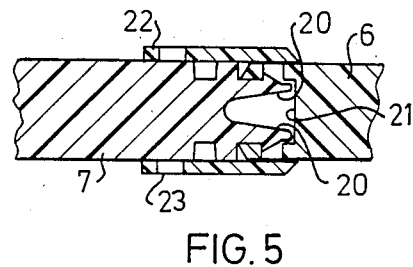
FIG. 5 is a view taken on the line VI—VI in FIG. 6.

By modifying the end of the sapcer shaft 7 engaging the holder 5 in the manner illustrated in FIGS. 5 and 6, the spacer shaft can be used instead for fixing the pivot shaft 6. The square end part of the spacer shaft 7 is in this case slotted and provided with two hook 20 which project into and firmly hooked in a recess 21 of square cross-section in the pivot shaft. In this embodiment, the bush 11 of the holder 5 has a circular inner cross section. In this case, the position of the spacer shaft in relation to the holder is fixed by means of diametrically opposed pairs of hook 22, each of which projects into a recess in a flange 23 on the spacer shaft and is firmly hooked behind the flange.

Assembly of the components prior to embedding the same in the foamed plastic can be readily carried out. The ends of the spacer shaft 7 are first pushed into respective bushes 10,11 on the main bearing 2 and the holder 5. Subsequent to fitting the spring clamp 3 over the bearing 2, one end of the wire frame 8 is inserted laterally into the gap 13 and in between the acrcuate end portion 16a, 17a of the spring legs, whereafter the other end of the wire frame is moved from below into the gap 15 between the flanges of the holder and is presed up until the wire-end of the wire frames snaps in above the hooks 18. The various components now form a integral unit and can be placed in the moulding tool.

I claim:

1. A sun visor for motor vehicles, including an elongated body comprising moulded compressible material; a main bearing for rotatably mounting a main shaft; and a shaft holder for a second bearing, the main bearing and the holder being embedded in spaced apart relationship in the body material, in the vicinity of one long side of said body, the mutual positions of the main bearing and the holder in the elongatd body being fixed by means of a separate spacer element arranged between said main bearing and said holder and comprising a rigid material, the spacer element (7) being non-rotatably connected to the main bearing and the holder and having the form of a spacer shaft whose central axis coincides with the central axes of the main shaft and the shaft holder and which has end poritons of non-circular cross-section; the main bearing and the holder having bushes of corresponding internal cross-sectional shape, into which said end portions are inserted.

2. A sun visor according to claim 1, characterized in that one end of the spacer shaft is provided with means for coupling with the pivot shaft of the holder and for fixing the pivot shaft against rotational and axial movement in relation to the spacer shaft.

3. A sun visor according to claim 1, characterized in that a metal wire-frame is embedded in the elongated body, said frame being in connection with the main bearing, and the holder.

4. A sun visor according to claim 3, characterized in that the wire-frame is fixed to the main bearing by means of a spring device which engages over the main bearing and, with opposite, mutually laterally displaced spring legs, presses against the main shaft through an opening in the main bearing.

5. A sun visor according to claim 4, characterized in that the spring legs have end portions which are alternately bent in different directions and which engage around the wire frame, said end portions being so positioned that the wire frame counteracts the forces urging the spring legs apart on both sides of the main shaft.

6. A sun visor according to claim 3, characterized in that the wire frame is so connected to the holder that the wire frame is freely moveable in relation to the holder in the longitudinal direction of the spacer shaft.

7. Bearing means for a vehicle sun visor, including a bearing sleeve for rotatably journalling a main shaft, characterized in that a pair of flanges project downwards from the bearing sleeve and define therebetween a gap for accomodating a stiffenig metal-wire frame; and in that a U-shaped spring means engages over the bearing sleeve and has opposing, mutually laterally displaced spring legs, which press against the main shaft through openings in the bearing sleeve and the ends of which project into the gap between said flanges and are there arcuately outwardly bent so as to engage the wire frame therebetween in a manner such that the wire frame counteracts the forces urging the spring legs apart on both sides of the main shaft.

* * * * *